Jan. 19, 1971 R. L. HEILMAN 3,556,645
LENS CARRIER FOR ATHLETIC HEADGEAR
Filed April 29, 1968 2 Sheets-Sheet 1
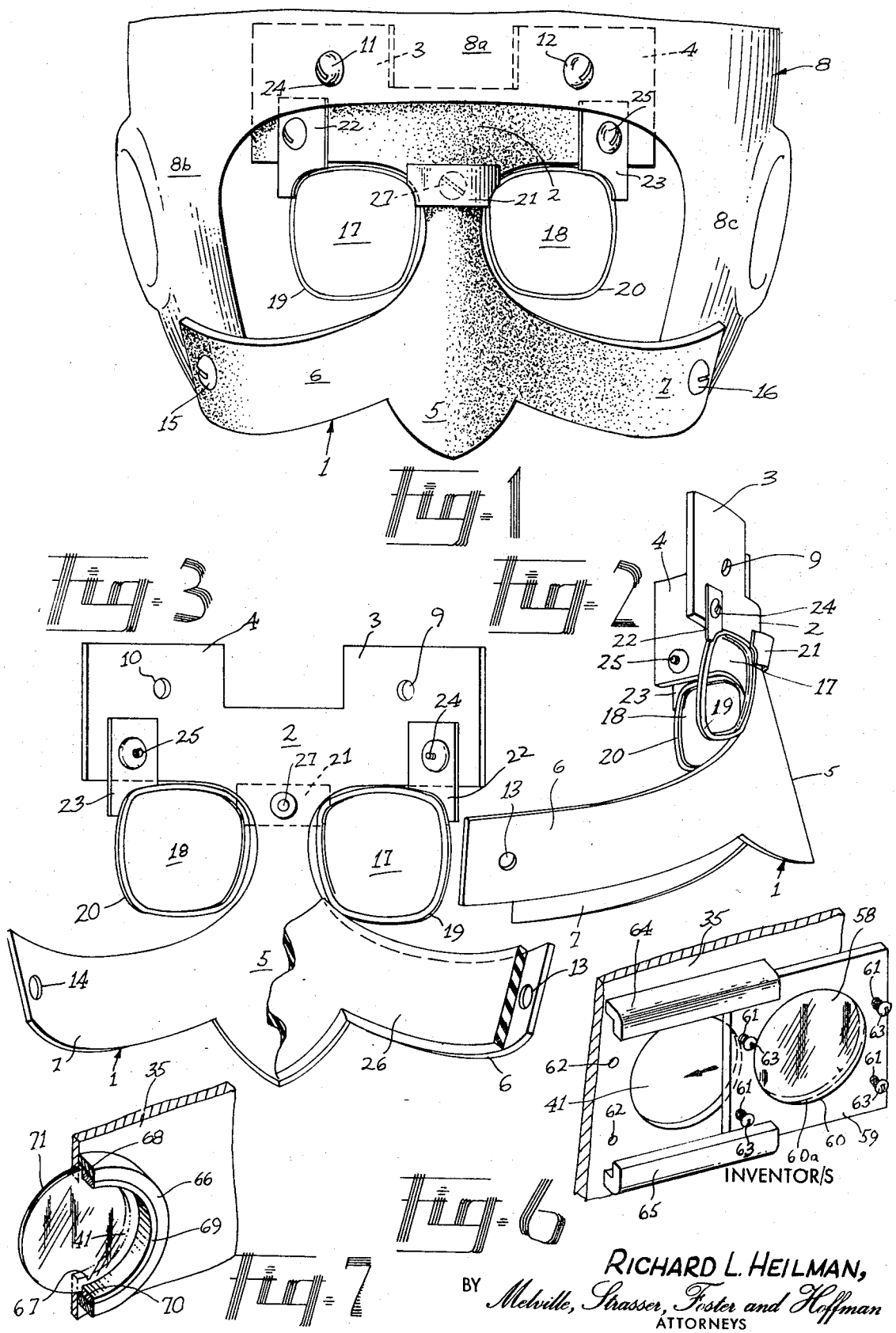
INVENTOR/S
RICHARD L. HEILMAN,
BY Melville, Strasser, Foster and Hoffman
ATTORNEYS Jan. 19, 1971  R. L. HEILMAN  3,556,645
LENS CARRIER FOR ATHLETIC HEADGEAR
Filed April 29, 1968  2 Sheets-Sheet 2
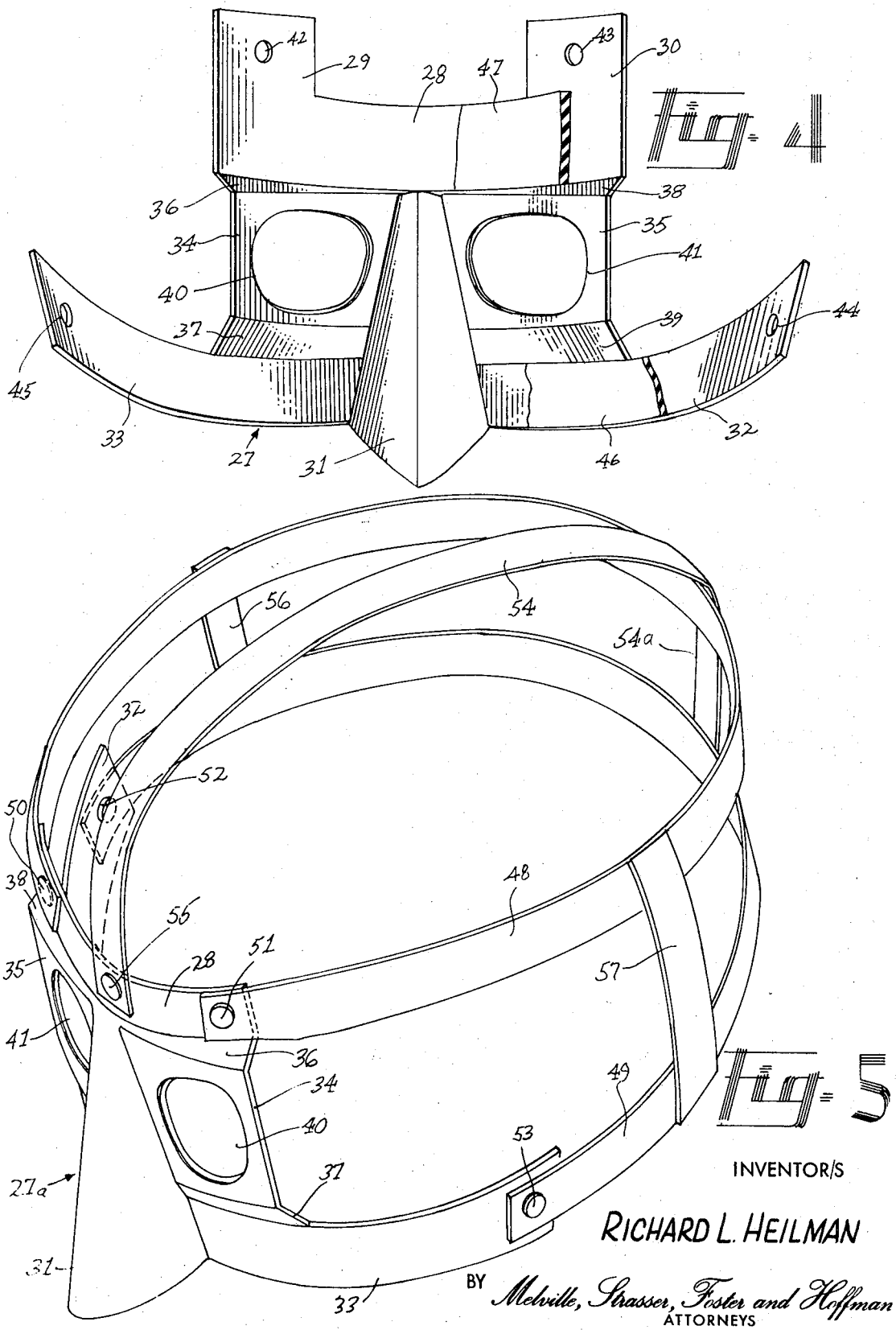
INVENTOR/S
RICHARD L. HEILMAN
BY Melville, Strasser, Foster and Hoffman
ATTORNEYS

# United States Patent Office 3,556,645
Patented Jan. 19, 1971

3,556,645
LENS CARRIER FOR ATHLETIC HEADGEAR
Richard L. Heilman, 96 Lumley Ave.,
Fort Thomas, Ky. 41075
Filed Apr. 29, 1968, Ser. No. 724,930
Int. Cl. G02c 3/02
U.S. Cl. 351—155                                9 Claims

ABSTRACT OF THE DISCLOSURE

A visual aid for participants in athletics and the like, suffering from a visual handicap correctable by lenses, comprising prescription ground lenses mounted on a carrier. The carrier comprises an element covering the forehead, nose and cheekbones of the participant and is held in place by suitable means such as straps or athletic headgear. The carrier is so configured as to maintain the lenses in proper position with respect to the participant's eyes.

BACKGROUND OF THE INVENTION

(1) Field of invention

The invention relates to a visual aid and more particularly to means for maintaining lenses, such as prescription lenses, in proper position with respect to the eyes of a participant in sports or the like.

(2) Description of the prior art

Heretofore, persons with low visual acuity or any similar visual handicap, correctable by prescription lenses, have been at a great disadvantage when participating in sports or other endeavors requiring a great deal of physical activity. For example, athletes have attempted to wear the usual type of glasses, with resilient band means affixed to the temple portions of the glasses frames and passing about the back of the head. Such an arrangement, however, is generally insufficient to maintain the glasses in their proper position with respect to the athlete's eyes during periods of extreme physical activity or violent bodily contact. In addition, the usual type of glasses frames maintain the lenses at a relative short distance from the eyes. This often results in curtailing the flow of air about the lenses to the extent that the lenses will tend to "fog."

More recently, contact lenses have come into wide spread use, but they too have a number of disadvantages. For example, not everyone's eyes are suitable for the use of contact lenses. In addition, during periods of extreme activity or bodily contact, contact lenses may be dislodged from their proper position and may even become wholly dislodged from the user's eyes entailing considerable expenses if lost and required to be replaced.

The means of the present invention is particularly adapted for use in sports and similar activities. It may be worn alone or in association with headgear such as football helmets, racing helmets and the like. The means of the present invention enables the use of perscription lenses of plastic or heat treated shatterproof glass. During periods of extreme activity or bodily contact, the structure of the present invention will maintain perscription lenses in proper position with respect to the user's eyes and will hold the lenses at such distance from the user's eyes as to permit sufficient air circulation about the lenses to greatly reduce the tendency to "fog." The structure of the present invention is easy and inexpensive to manufacture and may be readily adapted to the individual's needs by a qualified optician.

SUMMARY OF THE INVENTION

The means of the present invention is adapted for use by itself or in association with protective headgear of the type worn in various sports activities and the like. In one embodiment the device comprises a carrier adapted to be affixed to headgear and to cover the wearer's forehead, nose and cheekbones. The carrier is preferably molded or formed of plastic or similar material. The inside surface of the carrier may be padded in those areas where facial contact may occur.

A frame, configured as described below, is provided with a bridge spanning the nose portion of the carrier, and flange means affixed to the extreme upper corners of the frame. The flange means are, in turn, bolted to the carrier so as to be rigidly affixed thereto.

The frame is adapted to receive and retain a pair of prescription lenses. The lenses may be made of plastic or heat treated glass. The carrier-frame assembly is so affixed to the headgear as to maintain the lenses at a sufficient distance from the wearer's eyes to permit air circulation about the lenses and to prevent "fogging" thereof.

In another embodiment, the device comprises a carrier which may be affixed to headgear, or which may be held in place on the wearer's head by strap means. In this instance, the carrier covers the wearer's forehead, nose and cheekbones, and has portions spaced from the eyes and provided with openings therethrough. Means are affixed to the last mentioned portions of the carrier for maintaining prescription lenses in the areas of the openings and at a sufficient distance from the wearer's eyes to prevent "fogging."

BRIEF DESCRIPTION OF THE DRAWINGS

FIG. 1 is a front perspective view of one embodiment of the device of the present invention, illustrating it as being affixed to a protective helmet.

FIG. 2 is a side perspective view of the embodiment of FIG. 1.

FIG. 3 is a rear perspective view of the embodiment of FIG. 1.

FIG. 4 is a rear perspective view of a second embodiment of the invention.

FIG. 5 is a perspective view of an embodiment of the invention similar to that of FIG. 4 but adapted for use with strap means.

FIG. 6 is a fragmentary perspective view illustrating means for affixing prescription lenses to the carriers illustrated in FIGS. 4 and 5.

FIG. 7 is a fragmentary perspective view illustrating another means for affixing prescription lenses to the carriers illustrated in FIGS. 4 and 5.

DESCRIPTION OF THE PREFERRED EMBODIMENTS

Referring to FIGS. 1 through 3, one embodiment of the present invention comprises a carrier generally indicated at 1. The carrier may be made of any suitable material including plastic, hard rubber or the like. The carrier may be properly shaped by forming, molding or other processes well known in the art.

The carrier comprises a brow element 2 having upwardly extending portions 3 and 4. A nose portion 5 depends downwardly from the brow element and has lateral extensions 6 and 7.

The carrier, thus far described, is preferably a unitary, one-piece structure. As is most clearly seen in FIG. 2, the brow element, including the extended portions 3 and 4, may be transversely curved to conform to the inner surface of the brow portion of a helmet. The nose portion 5 extends downwardly and outwardly and is configured to accommodate the wearer's nose. Lateral extensions 6 and 7 are curved in such a way as to extend rearwardly of the nose portion 5.

For purposes of an exemplary showing, FIG. 1 illustrates the carrier 1 affixed to a conventional football helmet. It will be understood that the use of the device is not so limited, the device being applicable to any suitable headgear. The helmet (generally indicated at 8) is adapted to cover the wearer's head, except for the face, and has a brow portion 8a, and side portions 8b and 8c for covering the wearer's ears.

The extensions 3 and 4 of the carrier have perforations 9 and 10 respectively. The brow portion 8a of the helmet is provided with a matching pair of perforations (not shown). The brow element 2 of the carrier is affixed to the helmet by means of bolts 11 and 12, extending through the perforations 9 and 10 and the matching perforations in the helmet.

The ends of the extensions 6 and 7 have perforations 13 and 14 respectively. The portions 8b and 8c of the helmet are provided with matching perforations (not shown). As shown in FIG. 1, the extensions 6 and 7 may be affixed to the helmet portions 8b and 8c respectively by means of bolts 15 and 16. The bolts 15 and 16 pass through the perforations 13 and 14 in the extensions and the matching perforations in the helmet.

In many instances, the portions 8b and 8c of the helmet are already provided with perforations suitable to accept the bolts 15 and 16. Such perforations are generally used to affix a conventional chin strap (not shown) and conventional face guard means (not shown) to the helmet. It is within the scope of the present invention to use bolts 15 and 16 not only to affix extensions 6 and 7 to the helmet but also to affix chin strap and face guard means thereto, as well. When the present invention is applied to a football helmet, it is preferable to provide the helmet with face guard means. A wide variety of face guard means is available, and the type of face guard means used does not constitute limitation on the present invention.

The carrier 1 is adapted to support a pair of lenses 17 and 18. The lenses 17 and 18 may be made of plastic or heat treated shatterproof glass. The lenses may be tinted or clear, and may be prescription lenses for correcting a visual deficiency.

The lenses 17 and 18 are affixed in a conventional manner to frames 19 and 20 respectively. The frames 19 and 20 are joined by a bridge 21 adapted to span the upper part of the nose portion 5 of the carrier.

The frames 19 and 20 are also provided with upwardly extending flanges 22 and 23 respectively. The frames 19 and 20, flanges 22 and 23, and the bridge 21 may be made of any suitable material and may, if desired, constitute a unitary, one-piece structure. While the invention is not intended to be so limited, it has been found preferable to fabricate these elements of metal and to affix the flanges and bridge element to the frames by any suitable means such as soldering, or the like.

The flanges 22 and 23 and the brow portion 2 of the carrier are provided with coaxial perforations (not shown). The frame assembly, comprising lenses 17 and 18, frames 19 and 20, bridge element 21 and flanges 22 and 23, may be affixed to the carrier by means of bolts 24 and 25, passing through the coaxial perforations in the flanges and brow element. When extra strength is needed, the frame assembly may be additionally held to the carrier by a third bolt passing through the bridge 21 and the carrier. Such a bolt is indicated in dotted lines in FIG. 1.

It will be understood by one skilled in the art that the bolts 11 and 12, 15 and 16, and 24 and 25 may be replaced by any suitable fastening means including rivets or the like. It has been found preferable, however, to use bolts or other easily removable fastening means so that the carrier may be readily removed from the helmet and the frame assembly may be easily removed from the carrier. In this way, repairs or adjustments may be made to the carrier or frame assembly. In addition, the device of the present invention may be replaced when the helmet is to be used by another having a different visual handicap. Similarly, the device may be removed from the helmet when the helmet is to be used by one who does not need visual correction.

In the usual construction of football helmets and similar sports headgear, a band and webbing assembly is provided which engages the wearer's head and maintains the helmet in spaced relationship to the wearer's head. As a result, the lense assembly on the carrier of the present invention will hold the lenses at a distance from the wearer's eyes greater than is usual with ordinary glasses. This will insure sufficient air circulation about the lenses to greatly reduce the tendency of the lenses to "fog." When prescription lenses are used, they will be refracted at a suitable distance to accommodate for the greater than usual distance between the lenses and the eyes. Similarly, in the lense grinding process, the optical centers of the lenses will be adjusted to suit the individual wearer.

FIG. 3 is a rear perspective view of the device of the present invention. As indicated therein, the inside surface of the carrier may be provided with padding 26 in those areas where contact with the face may occur. The padding 26 may be made of any suitable material such as rubber, plastic or fabric. The padding may be affixed to the inside surface of the carrier 1 by any suitable means including glue or tape. In many instances, it will be desirable to pad substantially the entire inside surface of the nose portion 5 and the extensions 6 and 7. Padding may also be applied to the brow portion 2.

In those helmets of the type having the interior webbing mentioned above, it will generally not be necessary to provide protection against the ends of bolts 11, 12, 24 and 25. These bolts will be maintained in spaced relationship with respect to the wearer's head by the webbing. When such is not the case, appropriate padding may be provided.

FIG. 4 illustrates another embodiment of the present invention wherein the frame assembly 19 through 23 of FIG. 1 has, in large part, been replaced by the carrier itself. In this instance, the carrier (generally indicated at 27) comprises a brow portion 28 having upward extensions 29 and 30, corresponding to the brow portion 2 and extensions 3 and 4 of the embodiment of FIG. 1. The carrier 27 also has a nose portion 31 and lateral extensions 32 and 33 corresponding to the nose portion 5 and lateral extensions 6 and 7 of the embodiment of FIG. 1. The carrier 27, additionally includes portions 34 and 35 adapted to lie in front of and in spaced relationship to the wearer's eyes. This spaced relationship of the portions 34 and 35 is maintained by carrier portions 36–37 and 38–39, respectively. The portions 34 and 35 are provided with perforations 40 and 41, respectively.

Again, the carrier of FIG. 4 is preferably a unitary, one-piece structure. It may be made of any suitable material including plastic, hard rubber or the like and may be shaped by forming, molding or other suitable processes. The brow portion 28 may be transversely curved to conform more nearly to the wearer's forehead and the inner surface of the brow portion of a helmet. Lateral extensions 32 and 33 are curved so as to extend rearwardly of the nose portion 31.

The extensions 29 and 30 may have perforations 42 and 43, corresponding to the perforations 9 and 10 of the embodiment illustrated in FIG. 3. Similarly, the extensions 32 and 33 may have perforations 44 and 45, respectively, corresponding to the perforations illustrated at 13 and 14 in FIG. 3. Thus, the carrier of FIG. 4 may be affixed to a helmet (not shown) in a manner identical to that shown and described with respect to the embodiment of FIGS. 1 through 3. The inside surface of the carrier 27 may be provided with padding in those areas where contact with the face may occur. For purposes of an exemplary showing, such padding is fragmentarily indicated at 46 and 47.

The carrier of FIG. 5, generally indicated at 27a, is substantially identical to that shown in FIG. 4, and like parts have been given like index numerals. The carrier 27a differs from the carrier 27 only in that the extensions 29 and 30 of the brow portion have been eliminated. The carrier 27a is adapted to be affixed to the wearer's head by strap means and may be used with or without headgear. For purposes of an exemplary illustration, a strap assembly is shown comprising straps 48 and 49, adapted to pass around the wearer's head. The ends of the strap 48 are affixed to the brow portion 28 of the carrier by fastening means 50 and 51. The ends of the strap 49 are affixed to the lateral extensions 32 and 33 by fastening means 52 and 53, respectively. A third strap 54 is attached to the straps 48 and 49 and extends across the top of the wearer's head. The free end of strap 54 is affixed to the brow portion 28 of the carrier by fastening means 55. The proper relative positions of straps 48 and 49 may be maintained by auxiliary straps 56 and 57 and that portion 54a of the strap 54 which is affixed to the straps 48 and 49 and extends therebetween.

It will be understood by one skilled in the art that the various straps may be made of any suitable material well known in the art, such as webbing, elastic material or the like. The fastening means 50 through 53 and 55 may be of any suitable permanent, non-detachable type, such as rivets or the like. It is also within the scope of the present invention to use detachable fastening means such as snaps or the like.

The carrier of FIG. 5 should be provided with padding on those surfaces thereof which will contact the wearer's face. In this way, the wearer's face will also be protected from adjacent parts of the fastening means.

FIGS. 6 and 7 illustrate means for affixing lenses to the carriers of FIGS. 4 and 5. While the means of FIGS. 6 and 7 will be described in terms of affixing the lenses to the inside surfaces of portions 34 and 35 of the carriers of FIGS. 4 and 5, it will be understood by one skilled in the art that the same means may be used to affix the lenses to the outside surfaces of portions 34 and 35.

FIG. 6 fragmentarily illustrates the portion 35 of the carriers 27 and 27a. For purposes of an exemplary illustration, the opening 41 is illustrated as being circular in FIG. 6. It will be understood by one skilled in the art that the openings or perforations 40 and 41 may have any suitable configuration such as the configuration illustrated in FIGS. 4 and 5.

FIG. 6 also illustrates a lens 58 held in a lens plate 59. The lens plate 59 may be made of any suitable material such as plastic or the like. The lens plate has an opening or perforation 60, which preferably has a configuration substantially similar to that of the perforation 41. The inside surface of the lens plate 59, formed by the perforation 60 may be notched as at 60a so that the lens 58 may be mounted in and held by the lens plate in the conventional manner.

The lens-lens plate assembly may be affixed to the inside surface of the portion 35 of the carrier by any suitable means. For purposes of an exemplary showing, the lens plate 59 is illustrated as having four perforations 61 and the carrier portion 35 is shown as having matching perforations (two of which are shown at 62). Under such circumstances, the lens plate 59 is affixed to the carrier portion 35 by means of screws 63 passing through cooperating pairs of perforations 61 and 62. When desired, the screws may be provided with suitable lock nuts (not shown).

When the lens-lens plate assembly is in place on the inside surface of the portion 35 of the carrier, it will be understood that the opening 60 in the lens plate will overlie the opening 41 in the carrier. It will further be understood by one skilled in the art that the carrier portion 34 will have affixed thereto a similar lens-lens plate assembly. For added strength, and to aid in the proper adjustment of the lens plates, guide means may be provided on the inside surfaces of the carrier portions 34 and 35. A pair of such guide means is illustrated in FIG. 6 at 64 and 65. The guide means may be an integral portion of the carrier or they may be joined thereto by any suitable means including glue or the like. As illustrated in FIG. 6, the guides 64 and 65 have portions adapted to overlap the top and bottom edges of the lens plate 58, forming slides or notches into which the lens plate 58 may be received.

When a carrier of the type shown in FIG. 4 or 5 is provided with lens holding means of the type shown in FIG. 6, the optical centers of the lenses may be adjusted in the lens grinding process and/or by lateral shifting of the lens-lens plate assemblies, with respect to each other, prior to the joinder of the lens plates to the carrier.

FIG. 7 illustrates another manner in which lenses may be affixed to carriers of the type shown in FIGS. 4 and 5. In FIG. 7, the portion 35 of the carrier is fragmentarily shown. In this instance, the opening 41 is circular in configuration and is surrounded by a ring 66. The ring 66 is affixed to the inside surface of the carrier portion 35 by any suitable means including glue. It will be noted that the ring 66 has an inside diameter slightly greater than the diameter of the perforation 41 so as to form an annular surface 67. In addition, the inside surface of the ring 66 is threaded as at 68.

A second ring 69 has threads 70 on its exterior surface, adapted to cooperate with the threads 68. A lens 71 of circular configuration is also provided. The diameter of the lens 71 is greater than the diameter of the opening 41, but slightly smaller than the inside diameter of the ring 66.

As illustrated in FIG. 7, the lens 71 may be located within the ring 66 and against the annular shoulder or surface 67. The ring 69 may then be threadedly engaged in the ring 66 and tightened against the lens 71. In this manner, the lens 71 is securely held in place by the annular surface 41 on the carrier, the ring 66 and the ring 69. Again it will be understood that the carrier portion 34 will be similarly provided with a circular lens and ring members equivalent to the rings 66 and 69.

When the lenses are affixed to the carriers of FIGS. 4 and 5 by the means illustrated in FIG. 7, the optical centers of the lenses will be adjusted in the lens grinding process to suit the individual wearer.

As indicated above, the means for affixing the lenses to the carrier (as shown in FIGS. 6 and 7) may be used to fasten the lenses to either the inside or outside surface of portions 34 and 35. Thus, FIGS. 6 and 7 may be regarded as illustrating either the inside or outside surface of portion 35.

It will be understood by one skilled in the art that the lens and carrier assemblies of FIGS. 4 through 7 will have all of the advantages set forth above with respect to the embodiment of FIGS. 1 through 3. The carriers of FIGS. 4 and 5 are so configured as to maintain the lenses at a sufficient distance from the wearer's eyes to substantially eliminate "fogging." Again, the lenses will be refracted at a suitable distance to accommodate for the greater than usual distance between the lenses and the wearer's eyes.

Modifications may be made in the invention without departing from the spirit of it.

The embodiments of the invention in which an exclusive property or privilege is claimed are defined as follows:

1. A visual aid for participants in athletics and the like comprising a carrier and a pair of lenses, said carrier comprising an open frame consisting of a horizontally oriented brow portion, a nose portion depending centrally from said brow portion and portions spaced from said brow portion and extending laterally from each side of said nose portion, means for affixing said lenses to said carrier, said lenses being located on either side of said nose portion and between said brow portion and said lateral extensions, and means for maintaining said carrier and said lenses in proper position with respect to the wearer's eyes, said maintaining means comprising headgear of the type having a rigid brow portion and rigid, downwardly extending ear-covering portions, said brow portion of said carrier being affixed to said brow portion of said headgear, and each of said lateral extensions of said carrier being affixed to an adjacent one of said ear-covering means of said headgear, said lenses being spaced from the wearer's eyes by a distance sufficient to permit air circulation therebetween such as to prevent fogging of said lenses, said frame being open at the wearer's temples to permit said air circulation.

2. The structure claimed in claim 1 wherein said carrier is an integral, one-piece structure.

3. The structure claimed in claim 1 wherein said means for affixing said lenses to said carrier comprises a lens frame about each of said lenses, a bridge located between and affixed to said lens frames, said bridge spanning said nose portion of said carrier, each of said lens frames having an upwardly extending flange, and fastening means for affixing said flanges to said brow portion of said carrier.

4. The structure claimed in claim 1 including padding affixed to portions at least of the inside surface of said carrier.

5. The structure claimed in claim 1 wherein said means to affix said lenses to said carrier comprises members extending laterally from either side of said nose portion and from said brow portion to said lateral extensions, each of said members having an opening therein, means for affixing said lenses to said members with said lenses overlying said openings, said members being so configured and said openings being so located therein that said lenses lie opposite and in spaced relationship to the eyes of the wearer and forwardly of said brow portion and said lateral extensions.

6. The structure claimed in claim 5 wherein said open frame and members comprise an integral, one-piece structure.

7. The structure claimed in claim 5 wherein said openings are circular, and including a pair of first rings, one of said first rings being affixed to each of said members around said opening therein, each of said first rings having an inside diameter greater than the diameter of said opening it surrounds so as to define an annular surface on said member about said opening, said first rings being internally threaded, said lenses being circular and of such diameter as to lie within said first rings and abut said annular surfaces, a pair of second rings, said second rings having external threads adapted to cooperate with said internal threads of said first rings, each of said lenses being located within one of said first rings and abutting said adjacent annular surface, each of said second rings being threadedly engaged within one of said first rings and abutting said lens therein.

8. The structure claimed in claim 7 including a pair of lens plates having an opening therein, means for affixing one of said lens plates to each of said members, each of said lens plate openings corresponding to and being in alignment with the adjacent ones of said opening in said members and means for affixing one of said lenses in each of said lens plate openings.

9. The structure claimed in claim 8 wherein said means for affixing said lens plates to said members comprise a pair of spaced guide means affixed to each of said members and located on opposite sides of said opening therein, said lens plates being slidably engaged between said pairs of guide means.

References Cited

UNITED STATES PATENTS

| | | | |
|---|---|---|---|
| 1,651,488 | 12/1927 | Tully | 351—85UX |
| 2,523,067 | 9/1950 | Sherry | 350—254 |
| 3,189,918 | 6/1965 | Hiatt et al. | 2—9 |
| 2,409,140 | 10/1946 | Malcom | 351—154X |

FOREIGN PATENTS

| | | | |
|---|---|---|---|
| 608,735 | 2/1946 | Great Britain | 351—85 |

OTHER REFERENCES

Popular Science, September 1949, p. 153.

DAVID SCHONBERG, Primary Examiner

J. W. LEONARD, Assistant Examiner

U.S. Cl. X.R.

2—10; 351—62